United States Patent [19]

Trevisan

[11] 4,428,223
[45] Jan. 31, 1984

[54] APPARATUS FOR PERIODICALLY TESTING THE OPERATION OF SAFETY VALVES

[75] Inventor: Ottavio Trevisan, Mestre, Italy

[73] Assignee: Furmanite International Limited, England

[21] Appl. No.: 366,270

[22] Filed: Apr. 7, 1982

Related U.S. Application Data

[63] Continuation of Ser. No. 128,054, Mar. 7, 1980, abandoned.

[30] Foreign Application Priority Data

| May 16, 1978 | [GB] | United Kingdom | 85525 A/78 |
| Nov. 9, 1979 | [IT] | Italy | 27184 A/79 |
| Oct. 20, 1979 | [IT] | Italy | 7936509 |

[51] Int. Cl.³ .......................................... G01M 19/00
[52] U.S. Cl. ........................................ 73/4 R; 73/168
[58] Field of Search ............... 73/4 R, 161, 168, 789, 73/791–793, 798, 816, 825, 837, 862.54, 862.53

[56] References Cited

U.S. PATENT DOCUMENTS

| 2,419,293 | 4/1947 | Simonson | 73/4 R |
| 2,477,854 | 8/1949 | Baker | 73/862.54 X |
| 2,677,271 | 5/1954 | Faris, Jr. et al. | 73/816 X |
| 3,097,516 | 7/1963 | Reed et al. | 73/4 R |
| 3,285,065 | 11/1966 | Ragen et al. | 73/161 |
| 3,354,708 | 11/1967 | Joron | 73/842 X |
| 3,800,589 | 4/1974 | Wawra et al. | 73/816 X |
| 4,255,967 | 3/1981 | Grymonprez et al. | 73/4 R X |

Primary Examiner—Charles A. Ruehl
Attorney, Agent, or Firm—William A. Drucker

[57] ABSTRACT

Apparatus for periodically testing the operation of safety valves on pressure apparatus or vessels, comprises a load-bearing structure (P) fixedly arranged with respect to the pressure apparatus (R), a thrust generating assembly (7) cooperating with said load-bearing structure (P), and for gripping the safety valve (V) being tested. A dynamometer device (9) cooperates with the thrust generating assembly (7), and measures the force applied by the thrust generator (7) to the safety valve (V).

7 Claims, 4 Drawing Figures

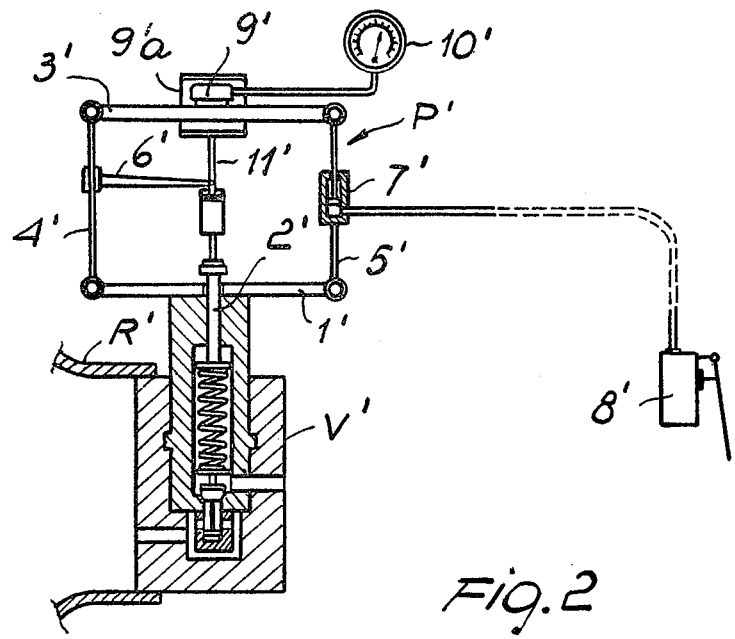
Fig. 2
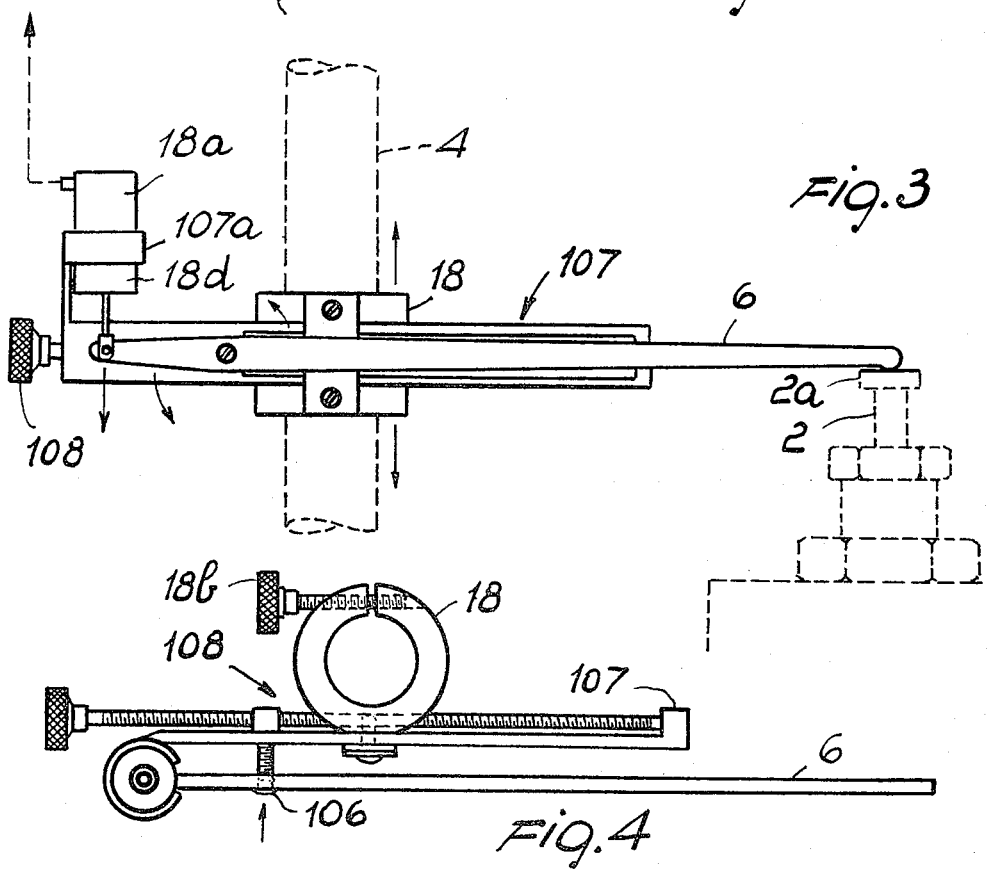
Fig. 3
Fig. 4

APPARATUS FOR PERIODICALLY TESTING THE OPERATION OF SAFETY VALVES

This is a continuation of Ser. No. 128,054 filed Mar. 7, 1980 now abandoned.

This invention relates to an apparatus for periodically testing the operation of safety valves on pressure apparatus or vessels.

As is known, a requisite of current safety regulations is that the safety valves of pressure apparatus or vessels be periodically tested to strict standards.

Safety valves are known to be held in their closed position by a calibrated spring, such as to allow the valve to open as a preset pressure, acting on the poppet member of the valve, is reached, the poppet member being usually a closure valve member which is movable to open against a closure spring and cooperates with a valve seat.

The safety valve test consists of checking that the valve actually opens at a preset value of the pressure.

Such tests were carried out, heretofore, sometimes by gradually increasing the pressure within the pressure apparatus or vessel the valves whereof had to undergo testing, until the maximum preset pressure level was reached. This involved, of course, considerable inconvenience because the normal operation had to be discontinued and the pressurized apparatus or vessel subjected to pressures significantly in excess of the normal operating pressure, with attendant appreciable strain of the materials. Moreover, an increased energy consumption was involved in raising the vessel pressure. Furthermore, as a result of industrial apparatus or vessels often including more than one safety valve, each valve being set for different levels, it became necessary to block all those valves which happened to be set for a lower pressure than the test pressure, which obviously involved complications of not negligible import. Bench tests have evident drawbacks.

This invention sets out to obviate the drawbacks indicated hereinabove.

To solve this problem, the Applicant has started from the awareness that, by removing the cover of a safety valve, it becomes possible to manipulate the poppet stem from the outside, such as to open the valve through the application of a given force to the stem in the valve opening direction, thereby overcoming the resistance of the valve closing spring.

Therefore, the problem arose of how to accurately determine the magnitude of said externally applied force at the moment the valve opened. Based upon said magnitude and the pressure acting within the vessel on the valve poppet member being known, it would be possible to calculate in a simple manner the inside pressure required to open the safety valve, if the latter were only subjected to the vessel internal pressure.

As mentioned already, the main problem encountered in practising this concept was that of an accurate determination of the force applied to the valve poppet stem at the moment the valve opens.

Attempts have been made to utilize, for the purpose indicated, the force delivered by a hydraulic cylinder-piston assembly, the fluid pressure whereof was measured at the moment the valve being tested popped out or opened. However, this approach implied considerable errors and shortcomings, since pneumatic assemblies take up 15-20% and hydraulic 2-5% of the force generated, not to mention errors in calculating the active area of the piston.

It is an object of this invention to solve the problem of providing an apparatus effective to create a force, applying said force to the valve under test, and measuring the magnitude of said force regardless of the device which generates it.

According to one aspect of this invention, there is provided an apparatus for periodically testing the operation of safety valves on pressure apparatus or vessels, comprising a load bearing structure fixedly arranged with respect to the pressure apparatus, a thrust generating assembly cooperating with said load-bearing structure, and means for gripping the safety valve being tested, characterized in that there is provided a dynamometer device cooperating with the thrust generating assembly, said dynamometer device measuring the force applied by the thrust generator to the safety valve being tested.

The invention will be more clearly described with reference to two exemplary embodiments of the invention, illustrated by way of example in the accompanying drawings, where:

FIG. 1 schematically illustrates a first embodiment of the invention;

FIG. 2 shows schematically a second embodiment of the invention; and

FIGS. 3 and 4 show some details.

Figure 1:
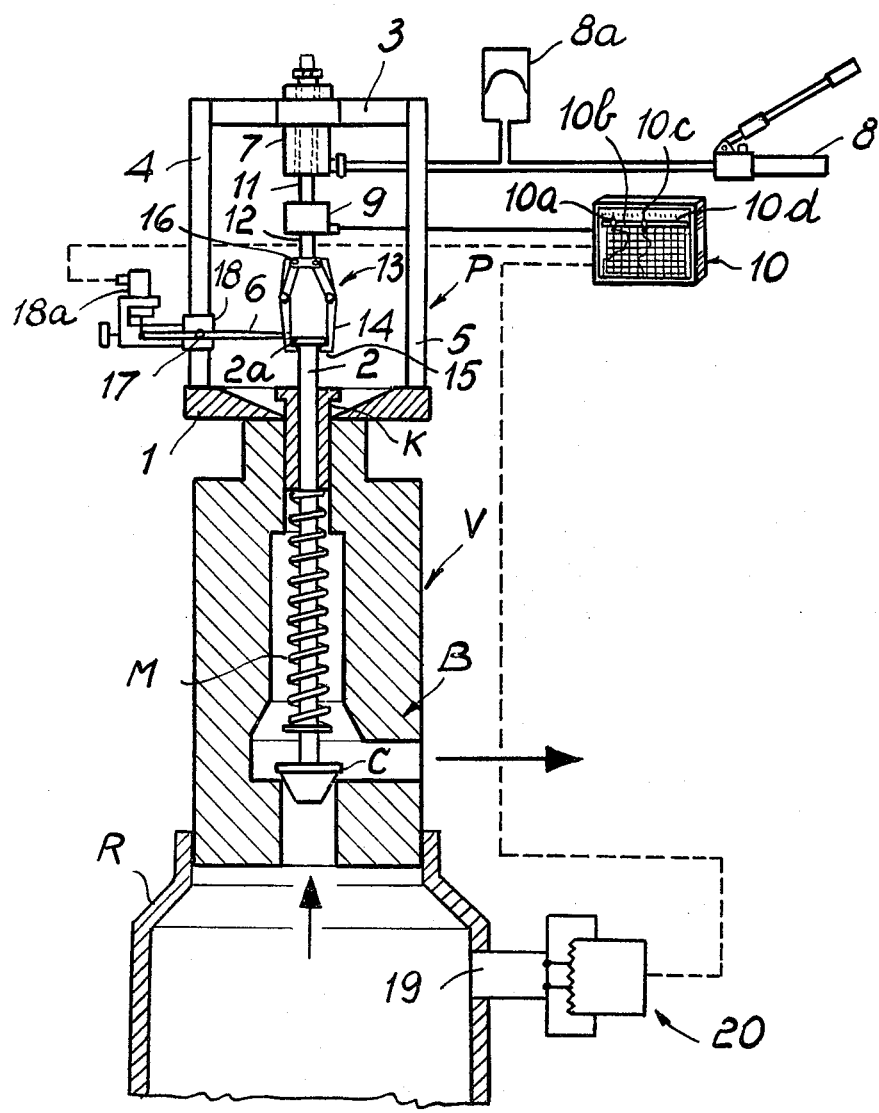

With reference to FIG. 1, a safety valve V comprises a housing B, a poppet member C, a spring M urging the poppet member to the closed position, a bushing K rigid with the housing B, and a stem 2 protruding out of the housing B and slidable in the fixed bushing K. The valve is mounted to the pressure vessel R and is shown with its cover removed, preparatory to the application of the apparatus of this invention. The load-bearing structure of that apparatus is indicated generally at P and is in the form of a yoke comprising a clamping collar 1 at its lower or bottom end, which collar on one side contacts the top surface of the housing B of the valve, and on the other side is clamped against the bushing K, such as to maintain the load-bearing structure P in a fixed position. The yoke P shown is manufactured by Enerpack Division of Applied Power Industries, Inc. of Butler, Wis., U.S.A., and is marketed under Model No. BHP 281 (single clamp); thus, it is considered that a more detailed description of such a yoke is unnecessary here, it being sufficient to mention that in addition to the clamping collar 1, it comprises uprights 4 and 5 and an upper or top cross-member 3. The cross-member 3 carries the cylinder-piston assembly 7, of the hydraulic type, which is hydraulically connected to a pump 8. The cylinder-piston assembly 7 is also manufactured by Enerpack Division of that same U.S. Company, and is sold under Model No. RCH-121 A, while the pump 8, also from the same Company, is sold under Model No. P-39 for one speed, and can operate at hydraulic pressures of up to 700 atmospheres. Thus, it is considered that no further details are required herein, it being sufficient to remark that the rod 11 of the cylinder-piston assembly 7 can be displaced axially within the cylinder of the assembly 7 as a result of the fluid pressure created by the pump 8. The free end of the rod 11 is connected to one end of a strain gauge 9 operating on the basis of changes in the electric resistor contained therein. This strain gauge may be a load cell "$U_2$ cell" from Hottinger Baldwin Messtechnik DBR, and it is considered unnecessary to provide further illustration of it, it being sufficient to note herein that its electric resistor is fed from a battery supply incorporated therein and that to the opposite side whereto the rod 11 is attached there is connected a column 12 of an articulated jaw gripping device, generally indicated at 13, the articulated jaws 14 whereof are provided at the bottom with hooked ends 15.

The gripping device 13 is made as an adaptation to an extractor of the cited Enerpack Division, and constructional details thereof are to be found in the Company's Catalogue, where it is described as Model No. HP 283, three-jaw type. It will be sufficient to remind herein that the articulated gripping members at the bottom end of the column 12, which end is in the form of a ring 16, are so configured that, as the column 12 is thrust upwards, the lower ends 15 of the clamps 14 are urged towards one another, thus tending to increase the clamping force applied to the head 2a of the stem 2 of the valve V. As the axial upward thrust decreases, the clamping force is released and the valve 2 is allowed to slide upwardly.

Turning back to the strain gauge 9, as is known, when to its operative ends a tension or a compression is applied, the resistance therein changes, thereby the parameters of the electric current through its electric circuit also change, from the changing of such parameters it being possible to determine the tension or compression force applied to the opposite operative ends of the gauge. In the example shown, the strain gauge 9 is connected to a suitably modified recorder 10 of the potentiometer type, of the Esterline Angus Instrument Corporation of Indianapolis, Ind., U.S.A., and designated "Miniservo III Bench" under Model No. MS 413 B. This modified recorder, therefore, will not be any further described, it being sufficient to observe herein that it is provided with graduations and pointers which read the magnitude of the tensile or compressive force applied to the strain gauge 9 itself, as well as other values and is adapted to the mentioned transducers.

The apparatus further includes a rocker arm type of rod 6, pivoted at 17 to a sleeve 18 which is frictionally slidable along the upright 4 of the yoke P. The pivot 17 is also of the friction adjustable type and adjustable in position, such as to allow the pivot to be shifted transversally in order to adapt it for the mutual positioning of the components and related tolerances. The rocker arm rod 6 is used to detect the displacement movements of the valve, and for this purpose, there is provided on the opposite end to the end contacting the valve a displacement transducer manufactured by Shaevitz EM Ltd, Slough, Great Britain, and designated in their Catalogue with Model No. E 100. This displacement transducer 18 is connected, in a manner known per se, to the recorder 10, which is equipped with an additional scale with pointer reading the valve displacement movements as well.

Normally, the pressure apparatus or vessel will be equipped with a pressure gauge indicating the internal pressure level thereof. The invention provides that, to the gauge fitting 19, a pressure transducer 20 be connected which can also be electrically connected to the recorder 10, which recorder can be advantageously provided with a further scale and pointer reading the pressure level as measured inside the pressure gauge. The pressure transducer 20 employed herein is of the "P 723" type, manufactured in Great Britain by Shaevitz.

The apparatus described in the foregoing operates as follows.

The pressurized vessel R is allowed to retain its normal operating pressure. The cover of the safety valve is removed and the yoke P installed by tightening the clamping collar 1 against the bushing K. Then the gripping device 13 is caused to grip the head 2a of the stem 2 of the valve. The tip of the rod 6 is made to rest on the center of the head 2a of the stem, and the sleeve 18 is positioned such that the rod 6 is preferably horizontal and transducer 18a zeroed. Then, the setscrew 18b of the sleeve 18 is tightened. The pressure transducer 20 is finally mounted to the gauge fitting 19 and connected to the recorder 10.

The apparatus is now ready to operate, it being actuated by operating the pump 8 which will deliver oil under pressure into the cylinder-piston assembly 7. The oil pressure in that cylinder, by acting on the related piston, will impart an upwardly directed thrust to the rod 11 of the piston, which rods acts on the strain gauge 9 to create expansion of the latter as due to the reaction to the raising movement produced by the column 12 of the gripping device 13 attached to the stem 2 of the valve. The strain gauge 9 will sense, through electrical parameters provided therein, the magnitude of the tensile force applied thereto, and pass the related signals to the recorder 10 whereof the pointer 10a reads on the scale 10b the magnitude of the tensile force thus generated. The pressure in the hydraulic circuit is raised by means of the pump 8 until the magnitude of the related thrust acting on the stem 11, and consequently on the strain gauge 9, through the gripper 13 on the stem 2 of the safety valve, reaches pop out values, i.e. a level which results in the safety valve opening. This level or value is graphically recorded, in a manner known per se, by the recorder 10 with very high precision. Simultaneously with the opening of the safety valve V, the rod 6 will detect the displacement of the poppet member C of the valve, by swinging about the frictionally adjustable pivot 17 thereof and actuating with its opposite end to the one contacting the stem 2 the displacement movement transducer 18a, which will measure, through electrical parameters, the displacement occurred and signal it to the recorder 10, which indicates, by means of the pointer 10c along the scale 10d, the amount of said displacement. At the same time, the pressure transducer 20 electrically signals to the recorder 10 the value or level of the pressure inside the vessel R, which value is displayed and recorded in a manner known per se by the recorder 10.

Thus, the three mechanical parameters involved in the valve pop out action can be read. Through such measured values, the active closure area of the valve V being known, it becomes easy to calculate the effective opening pressure of the safety valve under test, the value whereof can be thus compared with the standard setting of the safety valve.

In order to ascertain the so-called "blow-down", or closure variation of the valve, the pressure in the hydraulic circuit is gradually decreased until the safety valve V closes, the recorder 10 recording the magnitude of the corresponding thrust force, thus affording the possibility of calculating the closure pressure variation as based upon the difference between the calibration pressure and the closing pressure.

It will be apparent how the apparatus further affords control of the valve maximum lift.

In the embodiment shown in FIG. 2, equivalent component parts have been designated with the same reference numerals as in FIG. 1, but for the addition of an apostrophe. Therefore, such parts will not be further explained, because clearly deducible from the description given for FIG. 1.

It will be noted that in the second embodiment of the invention the yoke has been replaced with an articulated parallelogram P', which allows the apparatus to be adjusted sideways. Moreover, the cylinder-piston assembly 7' is mounted to the upright 5' which is divided in two sections, one section being rigid with the piston rod and the other section with the cylinder of the assembly 7'. It will be noted, moreover, that the force from the assembly 7' is transferred to the strain gauge 9' through the cross-member 3', which also functions as a lever. Furthermore, owing to the interposition of a bracket 9a', the strain gauge is caused to operate in compression.

FIGS. 3 and 4 illustrate the valve displacement measuring device, respectively in elevation and plan views. From the drawing, it is apparent that the rod 6 is pivoted at the pivot 106 which is carried by a bracket 107, which is in turn carried by the sleeve 18 through a threaded shaft 108. This mechanism permits the pivot 106 to be shifted sideways with respect to the upright 4 by turning the threaded shaft 108 threadably in or out. This displacement of the pivot 106 occurs rigidly with the rod 6 and displacement transducer 18a carried by the bracket 107, such that the free end of the rod 6 can be positioned as desired on the head 2a of the valve without altering the lever arms of the rod itself with respect to the pivot 106 and transducer 18a, the oscillation ratio of the rod ends not being influenced by the sideway displacement of the assembly, if it is remembered that the stem 18d of the sliding movement transducer can be shifted axially, the collar 107a of the bracket 107 leaving said shifting movement unimpeded.

In the hydraulic circuit which from pump 8 leads to the power unit 7 a plenum chamber or pressure accumulator 8a is advantageously inserted. Such plenum chamber may be of the kind provided with nitrogen pocket or compression chamber and is destined to supply the necessary pressure to the circuit, when such pressure abruptly lowers at the instant the safety valve opens. Owing to this plenum chamber 8a the sinking of the pressure in the line is gradual and abrupt oscillations thereof adversely influencing the graphic recording of the recorder 10 are avoided.

I claim:

1. In apparatus for periodically testing the operation of safety valves, on pressure apparatus and vessels, including a stem, said apparatus comprising:
   (a) a load-bearing structure fixedly arranged with respect to the pressure apparatus,
   (b) a thrust-generating assembly cooperating with said load-bearing structure, and
   (c) means for gripping the safety valve being tested, the improvement which comprises, in combination:
   (i) a steplessly-operable dynamometer device cooperating with the thrust generating assembly and measuring valve-state change-over force applied by the thrust generating assembly to the safety valve being tested,
   (ii) said load-bearing structure comprising a yoke having a clamping collar, uprights extending substantially perpendicular to the collar, and a cross-member substantially parallel to the collar and inter-connecting the uprights, the thrust-generating assembly being attached to said cross-member,
   (iii) safety valve gripping means connected to one end of the dynamometer device; said dynamometer device being connected with its other end to the thrust-generating assembly and being located between said thrust-generating assembly and said gripping means, said thrust-generating assembly and said dynamometer device and said gripping means being all aligned with one another and coaxial with said stem of the safety valve.

2. Apparatus, as claimed in claim 1, including a recorder connected to the dynamometer device for recording signals from the dynamometer device.

3. Apparatus for periodically testing the operation of safety valves in pressurized apparatus during normal operation of said pressurized apparatus, comprising a load-bearing structure fixedly arranged with respect to the pressurized apparatus at the position of a said safety valve, means for gripping said safety valve, a thrust-generating assembly intercoupling said gripping means and said load-bearing structure and serving to apply thrust which moves said gripping means in a direction relative to said load-bearing structure to open said safety valve, means controlling said thrust-generating assembly firstly to control opening of said safety valve and thereafter gradually reducing thrust to control closing of said safety valve, and a steplessly-operable dynamometer device associated with said thrust-generating assembly to measure valve-state change-over points at unseating and re-seating of said safety valve beng tested.

4. Apparatus for periodically testing the operation of safety valves in pressurized apparatus during normal operation of said pressurized apparatus, comprising a load-bearing structure fixedly arranged with respect to the pressurized apparatus at the position of said safety valve, means for gripping said safety valve, a thrust-generating assembly intercoupling said gripping means and said load-bearing structure and serving to apply thrust which moves said gripping means in a direction relative to said load-bearing structure to open said safety valve, means for controlling said thrust-generating assembly firstly to open said safety valve and thereafter gradually to reduce thrust to allow said safety valve to close itself, and a steplessly operable dynamometer device associated with said thrust-generating assembly to measure valve-state change-over points at unseating and re-seating of said safety valve being tested, further comprising means for measuring pressure in said pressurized apparatus, and means connected to said dynamometer device and said means for measuring pressure for recording said valve changeover points and a related output from said means for measuring pressure.

5. In apparatus for periodically testing the operation of safety valves, on pressure apparatus and vessels, including a stem, said apparatus comprising:
   (a) a load-bearing structure fixedly arranged with respect to the pressure apparatus,
   (b) a thrust-generating assembly cooperating with said load-bearing structure, and
   (c) means for gripping the safety valve being tested, the improvement which comprises:
   (i) a steplessly-operable dynamometer device cooperating with the thrust-generating assembly and measuring valve-state change-over force applied by the thrust-generating assembly to the safety valve being tested,
   (ii) said load-bearing structure comprising a yoke having a clamping collar, uprights extending substantially perpendicular to the collar, and a cross-member substantially parallel to the collar and interconnecting the uprights, the thrust-generating assembly being attached to said cross-member, (iii) safety valve gripping means connected to one end of the dynamometer device, said dynamometer device being connected with its other end to the thrust-generating assembly and being located between said thrust-generating assembly and said gripping means, said thrust-generating assembly and said dynamometer device and said gripping means all being aligned with one another and coaxial with said stem of the safety valve, (iv) a recorder connected to the dynamometer device for recording signals from the dynamometer device, (v) a displacement movement measuring device comprising a sleeve adjustably secured to one of said uprights of said yoke, said sleeve having a pivot, a rod mounted to said sleeve pivot and contacting with one of its ends said stem of the safety valve, a displacement movement transducer connected to said recorder for passing to said recorder signals corresponding to displacement movements of said valve stem, said transducer being connected to the other end of said rod.

6. Apparatus, as claimed in claim 5, wherein said pivot is on a bracket displaceable sideways with respect to said sleeve by screw-threaded means.

7. Apparatus, as claimed in claim 6, further comprising a gauge fitting on said pressure vessel, and a pressure transducer mounted on said gauge fitting and connected to said recorder.

* * * * *

REEXAMINATION CERTIFICATE (1091st)
United States Patent
Trevisan

[11] B1 4,428,223
[45] Certificate Issued Jul. 4, 1989

[54] APPARATUS FOR PERIODICALLY TESTING THE OPERATION OF SAFETY VALVES

[75] Inventor: Ottavio Trevisan, Mestre, Italy

[73] Assignee: Furmanite International Limited, England

Reexamination Request:
No. 90/001,700, Jan. 26, 1989

Reexamination Certificate for:
Patent No.: 4,428,223
Issued: Jan. 31, 1984
Appl. No.: 366,270
Filed: Apr. 7, 1982

Related U.S. Application Data

[63] Continuation of Ser. No. 128,054, Mar. 7, 1980, abandoned.

[51] Int. Cl.⁴ ............................................. G01M 19/00
[52] U.S. Cl. .......................................... 73/4 R; 73/168
[58] Field of Search ................................. 73/4 R, 168

[56] References Cited

U.S. PATENT DOCUMENTS

| | | |
|---|---|---|
| 2,419,293 | 4/1947 | Simonson . |
| 2,477,854 | 8/1949 | Baker . |
| 2,677,271 | 5/1954 | Faris, Jr. et al. . |
| 2,952,151 | 9/1960 | Simonson et al. . |
| 3,097,516 | 7/1963 | Reed et al. . |
| 3,269,170 | 8/1966 | Sebring et al. . |
| 3,285,065 | 11/1966 | Ragen et al. . |
| 3,354,708 | 11/1967 | Joron . |
| 3,800,589 | 4/1974 | Wawra et al. . |
| 4,152,932 | 5/1979 | Johnson . |
| 4,255,967 | 3/1981 | Grymonprez et al. . |
| 4,349,885 | 9/1982 | Thompson . |

FOREIGN PATENT DOCUMENTS

| | | |
|---|---|---|
| 869173 | 7/1978 | Belgium . |
| 0028661 | 11/1979 | European Pat. Off. . |
| 0007769 | 2/1980 | European Pat. Off. . |
| 0017365 | 10/1980 | European Pat. Off. . |
| 0133797 | 3/1985 | European Pat. Off. . |
| 800445 | 11/1950 | Fed. Rep. of Germany . |
| 840932 | 6/1952 | Fed. Rep. of Germany . |
| 1937198 | 2/1971 | Fed. Rep. of Germany . |
| 1773642 | 8/1971 | Fed. Rep. of Germany . |
| 2241125 | 2/1974 | Fed. Rep. of Germany . |
| 2041171 | 9/1980 | United Kingdom . |

OTHER PUBLICATIONS

1566 Hydroset Testing Device for Setting Maxiflow Valves, pp. 30–32.
European opposition Decision dated Jun. 10, 1986 in European Patent Application No. 79104473.8 filed Nov. 13, 1979.

*Primary Examiner*—Charles A. Ruehl

[57] ABSTRACT

Apparatus for periodically testing the operation of safety valves on pressure apparatus of vessels, comprises a load-bearing structure (P) fixedly arranged with respect to the pressure apparatus (R), a thrust generating assembly (7) cooperating with said load-bearing structure (P), and for gripping the safety valve (V) being tested. A dynamometer device (9) cooperates with the thrust generating assembly (7), and measures the force applied by the thrust generator (7) to the safety valve (V).

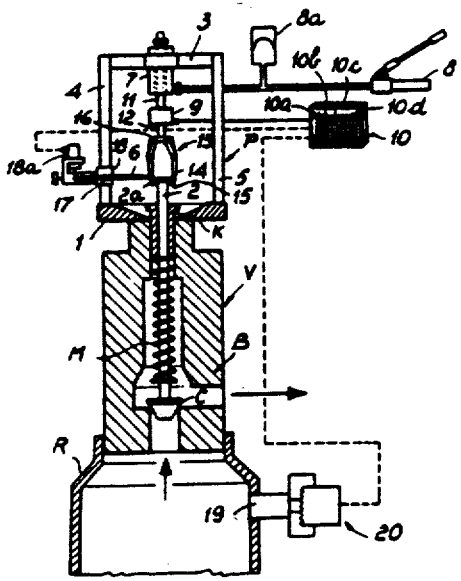

B1 4,428,223

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *